United States Patent Office  3,417,050
Patented Dec. 17, 1968 }

3,417,050
EPOXIDE RESIN PROCESS
Herbert P. Price and David A. Shimp, Louisville, Ky., assignors to Celanese Coatings Company, a corporation of Delaware
No Drawing. Filed May 4, 1965, Ser. No. 453,205
8 Claims. (Cl. 260—47)

ABSTRACT OF THE DISCLOSURE

A one step process for preparing low residual chlorine containing glycidyl polyethers of polyhydric phenols by reacting a solution of a polyhydric phenol in excess epichlorohydrin with a dispersion of finely divided alkali metal hydroxide suspended in an inert organic medium while simultaneously distilling water formed in the reaction from the reaction mixture during the addition of the alkali metal hydroxide dispersion.

---

This invention relates to an improved process for the manufacture of glycidyl ethers of polyhydric phenols. More particularly, the invention pertains to a method for producing glycidyl polyethers of polyhydric phenols having low chlorine contents.

Glycidyl ethers of polyhydric phenols are well known compositions of considerable commercial significance. They have been used as industrial casting, surface coatings, high-strength adhesives, durable laminates, cold solders, light-weight foams, and potting compounds for all varieties of electrical and electronic apparatus. These glycidyl polyethers are normally prepared by contacting a solution of epichlorohydrin and a polyhydric phenol with caustic. The caustic is added to the solution of epichlorohydrin and polyhydric phenol either as an aqueous solution or in solid, flake or pellet form. The use of an aqueous caustic solution has the disadvantage in that the large amount of water introduced into the system must be removed during the reaction in order to prevent undesirable side reactions. The use of flake caustic introduces handling problems as well as decreased reactivity because of the relatively small surface area of the large caustic particles.

Glycidyl ethers of polyhydric phenols, which are prepared by reacting a polyhydric phenol, epichlorohydrin and caustic may contain residual chlorine in their end groups. This residual chlorine is present in two forms:

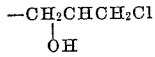

wherein a chlorine atom is attached to a carbon atom adjacent to a carbon atom containing a hydroxyl substituent; and as inactive chlorine

wherein the chlorine atom is attached to a carbon atom not adjacent to a carbon atom having a hydroxyl substituent. The sum of the two chlorines is referred to as total chlorine. The disadvantages of chlorine in epoxide resins is described in an article by Belanger and Schulte in "Modern Plastics," vol. 37, p. 154, November 1959.

Glycidyl ethers of polyhydric phenols which have found commercial acceptance have low chlorine contents; 0.2 weight percent or less. The reaction product obtained from a polyhydric phenol, epichlorohydrin and caustic can have residual chlorine contents as high as 0.5 to 1 weight percent or more. In order to lower the chlorine to an acceptable level, the glycidyl ether product must be post-treated in some manner, such as reaction with additional caustic, distillation or extraction.

It has now been found that glycidyl ethers of polyhydric phenols can be prepared by contacting a solution of epichlorohydrin and a polyhydric phenol with finely divided caustic dispersed in an organic medium. It has further been found that when such a caustic dispersion is used, the chlorine content of the glycidyl ether is lowered to an acceptable level, without the necessity for extensive post-treatments. According to the process of this invention, glycidyl ethers of polyhydric phenols are prepared by adding a finely divided alkali metal hydroxide dispersed in an organic liquid, wherein the organic liquid is substantially non-reactive with the alkali metal hydroxide and is substantially a non-solvent for the alkali metal hydroxide, to a solution of a polyhydric phenol in at least about 3 mols of epichlorohydrin per phenolic hydroxyl equivalent of the polyhydric phenol while simultaneously distilling water formed in the reaction from the reaction mixture wherein the total amount of hydroxide added is from about 1 to about 1.1 mols per phenolic hydroxyl equivalent of the polyhydric phenol. Low chlorine content glycidyl ethers of polyhydric phenols are produced in excellent yields.

The alkali metal hydroxide dispersions, or caustic dispersions as they will be referred to hereinafter, which are used in the process of this invention are dispersions or suspensions of finely divided caustic in an organic medium. The caustic is preferably sodium hydroxide, although potassium hydroxide can be used. The dispersing medium is an organic compound which is substantially unreactive with the caustic, is substantially a non-solvent for the caustic, contains no groups which are reactive with epoxide groups, is liquid above about 20° C., and has a boiling point above about 40° C. Such dispersing media include compounds containing hydrocarbon groups, and hydrocarbon ether groups. Examples of such compounds are hexane, octane, decane, dioxane, diisopropyl ether, dibutyl ether, benzene, toluene, xylene and the like, that is hydrocarbons containing from about 6 to about 20 carbon atoms and hydrocarbon ethers containing from about 4 to about 10 carbon atoms and 1 to 2 ether linkages.

Caustic dispersions can be quite simply made by stirring a finely divided caustic into the dispersing media. However since caustic, especially in a finely divided form, is quite hygroscopic, it is preferred to add the caustic to the dispersing media as flakes or pellets and to grind the caustic into a finely divided form while in the dispersing media. The grinding operation can be carried out in ball mills, roll mills, dispersators and the like. Dispersions can be made which contain from about 10 weight percent up to about 60 weight percent caustic, the preferred caustic content being from about 30 to about 50 weight percent.

Although caustic dispersions can be made using no additives, it is preferred to use a dispersing agent when the dispersion is made by grinding. Monomeric and polymeric fatty acids, that is acids having at least about 12 carbon atoms in their hydrocarbon chain, have been found to be very good dispersing agents for this system. These dispersing agents can be used in amounts from about 0.1 to about 1 weight percent based upon the weight of the total dispersion. Although the caustic has a tendency to settle out in these dispersions, it can be quite readily re-dispersed with agitation. The particle size of the caustic in the dispersions is from about 1 to about 100 microns with the average particle size being from about 5 to about 10 microns.

The caustic dispersions used in the process of this invention are quite mobile and can be pumped and poured.

The small particle size of the caustic furnishes greatly increased surface area which increases the reactivity of the caustic in the reaction giving shorter reaction times. The organic dispersing media also protects the caustic from atmospheric moisture.

A wide variety of polyhydric phenols can be used in the process of this invention. Typical polyhydric phenols include p,p'-dihydroxydiphenyl propane (bisphenol A as it is commonly known), resorcinol, hydroquinone, 1,5-dihydroxynaphthalene, p,p'-dihydroxydiphenyl, p,p'-dihydroxydiphenyl ethane, dihydroxydiphenyl sulfone, chlorinated and brominated derivatives of Bisphenol A, as well as low molecular weight novolak reins which are the reaction products of phenols and formaldehyde. The polyhydric phenols contain two or more phenolic hydroxyl groups per molecule and contain no other functional groups which are reactive with epoxy groups.

The epichlorohydrin used in the process is both a reactant and a solvent for the polyhydric phenol and the resulting glycidyl ether. The amount of epichlorohydrin used is about 3 to about 8 mols per phenolic hydroxyl equivalent of the polyhydric phenol and preferably about 4 to about 6 mols. Larger quantities can be used if desired, but they give no particular advantage since the unreacted epichlorohydrin must be recovered for matters of economy.

In carrying out the process of this invention, the epichlorohydrin is charged to the reactor and the polyhydric phenol is dissolved in the epichlorohydrin. The reactants are heated to about 100° C. to about 117° C. and the caustic dispersion is gradually added to the solution. Good agitation is required during this process to ensure uniform distribution of the caustic dispersion in the solution of epichlorohydrin and polyhydric phenol. During the caustic addition, the temperature of the reaction mixture is maintained at about 100° C. to about 120° C. and preferably at 105° C. to about 116° C., and the water formed during the reaction is continuously distilled from the reaction mixture. Correspondingly lower or higher temperatures are used if subatmospheric or superatmospheric pressures are employed. Epichlorohydrin distills along with the water. The epichlorohydrin distillate after being separated from the water distillate can be returned to the reaction mixture. The return of epichlorohydrin, however, is not necessary for the operation of this invention and it is preferred to separate the epichlorohydrin from the water and to store it for use in subsequent reactions.

The rate of caustic addition to the reaction mixture is governed by the ability to control the temperature within the desired limit and to control the distillation of the water and epichlorohydrin, without excessive foaming in the reactor. Generally, the caustic dispersion is added as rapidly as temperature control and foam formation will permit. This time can be as low as about 10 minutes up to about 90 minutes.

The total amount of caustic added as a dispersion is about 1 mol per phenolic hydroxyl equivalent of the polyhydric phenol with the preferred amount being about 1 to about 1.1 mols per phenolic hydroxyl equivalent.

The process of this invention can also be conducted by using only a portion of the caustic in the dispersed form provided the dispersed caustic is added last. For instance, caustic in flake or pellet form can be reacted with a solution of a polyhydric phenol in epichlorohydrin followed by distillation of the water of reaction. Caustic dispersion is then added to the reactants while maintaining the temperature of the reaction mixture at about 100° C. to about 120° C. and while continuously distilling off the water formed in the reaction. It has been found that low chlorine containing glycidyl polyethers of polyhydric phenols are obtained when at least about 10 weight percent of the total caustic added is in the dispersed form.

After completion of the caustic dispersion addition, the glycidyl ether of the polyhydric phenol is recovered by any available method known to those skilled in the art. By one method, the salt formed in the reaction can be filtered from the reaction mixture and the unreacted epichlorohydrin and dispersion medium can be distilled from the product. Another method is to distill the unreacted epichlorohydrin and dispersion medium from the resinous product and salt, dissolve the resin in an organic solvent and separate the salt by filtration or by adding water and separating the salt as brine solution. The product can be utilized in the solvent or can be recovered at 100 percent solids by distilling off the solvent. The resulting glycidyl polyether of the polyhydric phenol has high purity as evidenced by low chlorine content and high epoxide content.

The invention can be better understood from the following examples. The invention is not to be limited to the details described. Parts, where used, are parts by weight.

CAUSTIC DISPERSION PREPARATION

Example A 600 parts of dioxane, 400 parts of flake sodium hydroxide and 2 parts of stearic acid were mixed for 3 minutes in a Waring Blendor. The mixture was then ground for 22 hours in a pebble mill. The resulting dispersion was smooth and white.

The particle size of the sodium hydroxide in the dispersion, as determined by microscopic examination, ranged from 1 to 10 microns with an average size of about 5 microns.

Example B

A pebble mill was charged with 600 parts of xylene, 400 parts of sodium hydroxide and 4 parts of dimerized fatty acids. The mixture was ground for 23 hours, producing a smooth white dispersion.

GLYCIDYL ETHER PREPARATION

Example 1

To a suitable reaction flask equipped with a stirrer, thermometer, distillation head and dropping funnel were added 228 parts of p,p'-dihydroxydiphenyl propane and 925 parts of epichlorohydrin. A caustic dispersion containing 88 parts of sodium hydroxide, 132 parts of xylene and 0.88 part of dimerized fatty acid were added to the dropping funnel. Heat was applied to the reaction flask raising the temperature to 98° C. at which point addition of the caustic dispersion was begun. Within 3 minutes, the temperature rose to 116° C. and the water formed in the reaction began distilling over as a water-epichlorohydrin azeotrope. All of the caustic dispersion was added to the reaction flask over a period of 33 minutes while keeping the temperature between 108° C. and 116° C. and while distilling off the water of reaction. The temperature was then raised to 125° C. to ensure complete reaction of the caustic epichlorohydrin and dihydric phenol. After cooling to room temperature, the salt formed during the reaction was removed by filtration and the epichlorohydrin and xylene were removed from the resinous product by vacuum distillation to 155° C. at 25 mm. Hg pressure. The resinous product, 292 parts, had an epoxide equivalent weight of 191, a total chlorine content of 0.18 and an active chlorine content of 0.08.

Example 2

To a suitable reaction flask equipped as described in Example 1 were added 228 parts of p,p'-dihydroxydiphenyl propane and 925 parts of epichlorohydrin. A caustic dispersion made from 88 parts of sodium hydroxide, 132 parts of xylene and 0.88 part of dimerized fatty acids, were added to the dropping funnel. Heat was applied to the flask raising the temperature of the epichlorohydrin and the dihydric phenol to 115° C. The caustic dispersion was added to the reactants over a period of 53 minutes while keeping the temperature between 110° C. and 116° C. and while removing the water formed during the reaction as a water-epichlorohydrin azeotrope. After all the caustic dispersion had been added, the epichlorohydrin and solvents were distilled from the resinous product by heating to 150° C. under 25 mm. Hg pressure. 350 parts of methyl isobutyl ketone were added to the flask to dissolve the resinous product. 500 parts of water were then added to dissolve the salt formed during the reaction. The flask contents were heated to 90° C. with gentle stirring and were then poured into a separatory funnel. Two layers formed, the bottom layer being water and salt the upper layer being resin and solvent. The aqueous layer was drawn off and the resinous product was recovered by distilling off the methylisobutyl ketone to 150° C. under 25 mm. Hg pressure. The resinous product had an epoxide equivalent weight of 190, a total chlorine content of 0.15 and an active chlorine content of 0.07.

Example 3

To a suitable reaction flask equipped as described in Example 1 were added 228 parts of p,p'-dihydroxydiphenyl propane and 925 parts of epichlorohydrin. To the dropping funnel was added a caustic dispersion made from 88 parts of sodium hydroxide, 132 parts of xylene and 0.88 part of dimerized fatty acid. The caustic dispersion was added to the epichlorohydrin-dihydric phenol solution over a period of 43 minutes at a temperature of 110° C. to 115° C. while continuously removing the water formed during the reaction as a water-epichlorohydrin azeotrope. After all the caustic dispersion had been added, the epichlorohydrin was removed by distillation. 350 parts of xylene were added to the flask to dissolve the resinous product. The salt of reaction was removed by filtration. The salt cake was then extracted with acetone and the extract and xylene solution were combined. After the removal of acetone and xylene by distillation, a resinous product, 325 parts, was recovered having an epoxide equivalent weight of 189.5, a total chlorine content of 0.165, and an active chlorine content of 0.09.

Example 4

To a suitable reaction flask equipped with a stirrer, thermometer, dropping funnel, reflux condenser and inlet tube were added 228 parts of p,p'-dihydroxydiphenyl propane and 925 parts of epichlorohydrin. 40 parts of solid flake caustic were added to the flask and heat was applied. The temperature rose to 116° C. and was held at 100° C. to 116° C. for 18 minutes. The temperature was lowered to 50° C. and the reflux condenser was replaced with a distillation head. 40 parts of solid flake caustic were added and heat was reapplied. The temperature was then raised to 122° C. over a period of 1 hour and 25 minutes, while distilling off the water formed in the reaction as a water-epichlorohydrin azeotrope. A caustic dispersion containing 8 parts of sodium hydroxide, 12 parts of xylene, and 0.09 part of dimerized fatty acid were added to the dropping funnel. The caustic dispersion was added to the reactants over a period of 17 minutes at 110° C. to 125° C. while continuously removing the water formed during the reaction as a water-epichlorohydrin azeotrope. The reactants were then filtered to remove the salt formed during the reaction and the epichlorohydrin and xylene were removed by distillation. The resulting resinous product, 326.5 parts, had an epoxide equivalent weight of 190, a total chlorine content of 0.16 and an active chlorine content of 0.07.

Example 5

To a suitable reaction flask equipped as described in Example 1 were added 110 parts of resorcinol and 925 parts of epichlorohydrin. To the dropping funnel were added 88 parts of sodium hydroxide, 132 parts of xylene, and 0.88 part of dimerized fatty acid, as a caustic dispersion. The caustic dispersion was added to the epichlorohydrin-dihydric phenol solution over a period of 54 minutes while keeping the temperature at 110° C. to 115° C. and while continuously removing the water formed during the reaction as a water-epichlorohydrin azeotrope. After all the caustic dispersion had been added, the temperature was raised to 122° C. The reactants were then cooled, the salt was removed by filtration and the solvents were removed by distillation. The resulting resinous product, 208 parts, had an epoxide equivalent weight of 126, a total chlorine content of 0.3 and an active chlorine content of 0.18.

The epoxide resins produced by the process of this invention are useful in the production of protective coatings, molding resins, adhesives and the like. They can be cured with any of the well-known conventional epoxy resin curing agents to produce insoluble and infusible products.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing glycidyl ethers of a polyhydric phenol which comprises adding
    (A) a dispersion of about 10 to about 60 weight percent, based on the total weight of the dispersion, of finely divided alkali metal hydroxide having a particle size of about 1 to about 100 microns in an organic medium, wherein the organic medium is substantially non-reactive with the alkali metal hydroxide, is substantially a non-solvent for the alkali metal hydroxide, contains no groups which are reactive with epoxide groups, is liquid above about 20° C. and has a boiling point above about 40° C., to
    (B) a solution of a polyhydric phenol in at least about three mols of epichlorohydrin per phenolic hydroxyl equivalent of the polyhydric phenol
while holding the temperature of the reaction mixture at about 100° C. to about 120° C. and while simultaneously distilling water formed in the reaction from the reaction mixture, wherein the total amount of alkali metal hydroxide added is substantially equivalent to the phenolic hydroxyl equivalents of the polyhydric phenol.

2. The process of claim 1 wherein the organic medium is selected from at least one member of the group consisting of hydrocarbons containing from about 6 to about 20 carbon atoms and hydrocarbon ethers containing from about 4 to about 10 carbon atoms and 1 to 2 ether linkages.

3. The process of claim 1 wherein the polyhydric phenol is a dihydric phenol.

4. The process of claim 1 wherein the polyhydric phenol is p,p'-dihydroxydiphenyl propane.

5. The process of claim 1 wherein the alkali metal hydroxide is sodium hydroxide.

6. A process for preparing glycidyl ethers of a dihydric phenol which comprises adding
    (A) a dispersion of about 30 to about 50 weight percent based on the total weight of the dispersion, of finely divided sodium hydroxide having an average particle size of about 5 to about 10 microns in a hydrocarbon having 6 to 20 carbon atoms and being free of groups reactive with sodium hydroxide and with epoxide groups, to
    (B) a solution of a dihydric phenol in at least 8 mols of epichlorohydrin per mol of dihydric phenol
while simultaneously distilling water formed in the reaction from the reaction mixture, wherein the temperature of the reaction mixture is held at about 100° C. to about 120° C. and wherein the total amount of sodium hydroxide added is from about 2 to about 2.2 mols per mol of dihydric phenol.

7. The process of claim 6 wherein the dihydric phenol is p,p'-dihydroxydiphenyl propane.

8. A process for preparing glycidyl ethers of a polyhydric phenol which comprises adding an alkali metal hydroxide to a solution of a polyhydric phenol in at least about three mols of epichlorohydrin per phenolic hydroxyl equivalent of the polyhydric phenol, wherein the total amount of hydroxide added is substantially equivalent to the phenolic hydroxyl equivalents of the polyhydric phenol, wherein at least the last 10 weight percent of the total amount of alkali metal hydroxide added is in the form of a dispersion of about 10 to about 60 weight percent, based on the total weight of the dispersion, of finely divided alkali metal hydroxide having a particle size of about 1 to about 100 microns, in an organic medium wherein the organic medium is substantially non-reactive with the alkali metal hydroxide, is substantially a non-solvent for the alkali metal hydroxide, contains no groups which are reactive with epoxide groups, is liquid above about 20° C. and has a boiling point above 40° C., and wherein the dispersion of alkali metal hydroxide is added to the reaction mixture while holding the temperature of the reaction mixture at a temperature of about 100° C. to about 120° C. and while simultaneously distilling water formed in the reaction from the reaction mixture.

References Cited

UNITED STATES PATENTS

| | | | |
|---|---|---|---|
| 2,467,171 | 4/1949 | Werner et al. | 260—348.6 |
| 2,581,464 | 1/1952 | Zech | 260—348.6 |
| 2,841,595 | 7/1958 | Pezzaglia | 260—348.6 |
| 2,861,084 | 11/1958 | Starcher et al. | 260—348.6 |

HENRY R. JILES, *Primary Examiner.*

S. WINTERS, *Assistant Examiner.*

U.S. Cl. X.R.

260—348.6